Sept. 11, 1923.   H. M. PFLAGER   1,467,683
SIX-WHEEL CAR TRUCK
Original Filed May 26, 1921
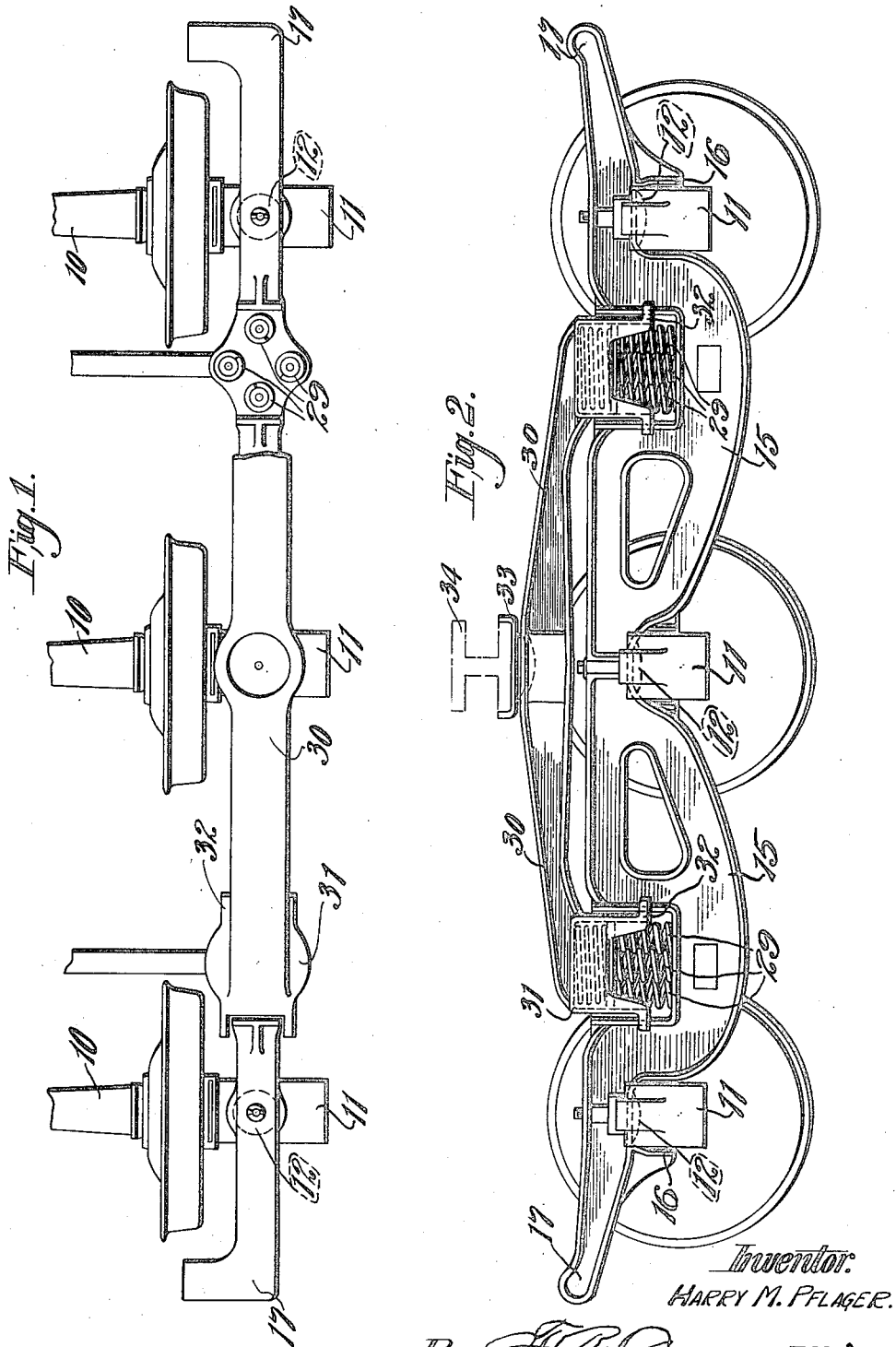
Inventor:
HARRY M. PFLAGER.

Patented Sept. 11, 1923.

1,467,683

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

SIX-WHEEL CAR TRUCK.

Original application filed May 26, 1921, Serial No. 472,826. Divided and this application filed May 16, 1922. Serial No. 561,429.

*To all whom it may concern:*

Be it known that I, HARRY M. PFLAGER, a citizen of the United States, residing at St. Louis, Missouri, have invented a certain new and useful Improvement in Six-Wheel Car Trucks, of which the following is a full, clear, and exact description, such as will enable others skilled in the art to which it appertains to make and use the same, reference being had to the accompanying drawings, forming part of this application, in which—

Figure 1 is a top plan view of the side portion of a six wheel truck frame of my improved construction, with one end of the equalizing member broken away.

Figure 2 is a side elevational view of a six wheel truck constructed in accordance with my invention.

This invention relates to a new and useful improvement in railway car trucks and more particularly to the side frame and spring equalizer arrangements for six wheel trucks, such as is shown and described in an application filed by me May 26th, 1921, Serial No. 472,826, of which this is a division.

The objects of my present invention are to form each side frame of the articulated truck in two parts that bear directly upon and are connected to the journal boxes, thereby providing side frames which have the desired degree of flexibility, each of said parts at its outer end being provided with means for supporting part of the brake rigging of the truck; and, further, to combine with each two-piece side frame, an equalizer member which serves as a support for the end of the body bolster, the end portions of said equalizer bearing upon springs that in turn bear upon parts of the side frame.

Referring by numerals to the accompanying drawings, which illustrate a practical embodiment of my invention, 10, 10 designate the ordinary wheel carrying axles of a six wheel truck, the journals thereof having bearing in journal boxes 11. The top plates of these journal boxes are provided with shallow cup-shaped recesses 12 which serve as rocking bearings for parts of the side frames of the truck.

Each side frame is formed in two parts, each comprising a body portion 15 that is provided in its underside and near its outer end with a recess or pocket 16 which receives the outer journal boxes 11. The outer end of each side frame member 15 terminates in an arm or bracket 17, the same projecting a substantial distance beyond the recess or pocket 16, and preferably formed with an inwardly extending projection serving as a support and point of attachment for a brake beam hanger (not shown).

30 indicates an equalizing member extending over the inner ends of portions of the side members 15 and provided with spring housings 31 at its extremities, which spring housing receives springs 29. The ends of the equalizer member 30 are guided in their vertical movement relative to the truck side frames by means of extensions 32, there being sufficient clearance between the parts to permit slight lateral play or movement.

34 is the body bolster of the car under frame provided with a plate 33, which plate has a rocking bearing connection with each equalizer member 30. By providing the extremities of the articulated side frames with extensions for supporting a part of the brake beam, it is obvious that in taking a curve, while the outer wheels and axles of the truck may swivel in their rocking bearing engagement with the truck side frames, such swiveling movement will be small relative to extensions 17, which extensions, in the main, follow the wheels and axles. However, this slight difference in the horizontal arcuate movements between the wheels and the extensions 17 is not sufficient to disarrange the brake rigging parts if the brakes are applied, or to prevent the application of the brakes to the wheels when the truck is on the curve.

Other features of my invention being fully described in the parent application (before mentioned) need not be described in detail here.

What I claim is:

1. In a six wheel car truck, a side frame in two parts, each part being flexibly connected to and resting upon the middle journal box of the truck and one of the outer journal boxes, means integral with each side frame part for supporting parts of the brake gear associated with the truck, and a spring supported equalizer carried by said side frame parts.

2. In a six wheel car truck, a side frame formed in two parts, each part being flexibly connected to and resting upon the middle journal box of the truck and one of the outer journal boxes, means integral with each side frame part for supporting parts of the brake gear associated with the truck, an equalizer member, and springs interposed between the side frame parts and said equalizer member.

3. In a six-wheel car truck, the combination of an articulated side frame flexibly connected to and supported upon the journal boxes of the truck, an equalizer member supported by the parts of said side frame and adapted to be pivotally connected to a part of the underframe of the car, said articulated side frame members being provided with integral extensions for supporting parts of the brake rigging whereby the brake rigging is maintained in operative relation to the wheels of the truck.

4. In a six-wheel car truck, the combination of wheels, axles and journal boxes, of side frame members articulated together and having a rocking bearing connection with said journal boxes, a member spring supported upon said side frame members and having a rocking bearing connection with a part of the underframe of a car, said bearing being in substantial alinement with the side frame, and integral extensions on said side frame members for supporting a part of the brake rigging to maintain operative relation between the wheels and the brake shoes when the truck is on a curve.

In testimony whereof I hereunto affix my signature this 10th day of May, 1922.

H. M. PFLAGER.